(12) United States Patent
Sato et al.

(10) Patent No.: US 11,869,219 B2
(45) Date of Patent: Jan. 9, 2024

(54) INSPECTION SUPPORT SYSTEM FOR ERRONEOUS ATTACHMENT USING IMAGE COLOR CONVERSION

(71) Applicant: SUBARU CORPORATION, Tokyo (JP)

(72) Inventors: Yoichi Sato, Tokyo (JP); Shoichiro Sako, Tokyo (JP); Marosuke Kikuchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 242 days.

(21) Appl. No.: 17/119,478

(22) Filed: Dec. 11, 2020

(65) Prior Publication Data

US 2021/0225036 A1  Jul. 22, 2021

(30) Foreign Application Priority Data

Jan. 17, 2020  (JP) .................. 2020-005929

(51) Int. Cl.
*G06T 7/90* (2017.01)
*G06T 7/00* (2017.01)
(Continued)

(52) U.S. Cl.
CPC ............. *G06T 7/90* (2017.01); *G06F 16/51* (2019.01); *G06T 7/97* (2017.01); *G06T 11/001* (2013.01)

(58) Field of Classification Search
CPC . G06T 7/90; G06T 7/97; G06T 11/001; G06T 2200/24; G06T 2207/10024; G06T 2207/30164; G06T 7/001; G06F 16/51
See application file for complete search history.

(56) References Cited

U.S. PATENT DOCUMENTS 9,672,226 B2  6/2017  Lu et al.
2011/0170786 A1*  7/2011  Naini .................. G06V 20/695
382/199

FOREIGN PATENT DOCUMENTS

JP        6-204700 A   7/1994
JP      H10-150299 A   6/1998
(Continued)

OTHER PUBLICATIONS

Extended European Search Report issued in corresponding European Patent Application No. 20 21 4054 dated Jun. 2, 2021.
(Continued)

*Primary Examiner* — Christopher Wait
(74) *Attorney, Agent, or Firm* — TROUTMAN PEPPER HAMILTON SANDERS LLP

(57) ABSTRACT

An inspection support system for erroneous attachment includes an imaging device and an erroneous attachment detector. The imaging device is configured to capture an image that represents a state in which multiple components are attached to each other. The erroneous attachment detector is configured to convert a color space of the image into an HSV color space, create a comparative image on the basis of hue and saturation in the HSV color space, determine whether the multiple components are each a correct component and whether the multiple components are attached in a correct manner by comparing the comparative image with a correct image that is based on the hue and the saturation, and detect the erroneous attachment of at least one of the multiple components, in a case where the at least one of the multiple components is not the correct component and/or is not attached in the correct manner.

19 Claims, 11 Drawing Sheets

(51) Int. Cl.
G06F 16/51 (2019.01)
G06T 11/00 (2006.01)

(56) References Cited

FOREIGN PATENT DOCUMENTS

| JP | 2001-353341 A | 12/2001 |
| JP | 2004-326382 A | 11/2004 |
| JP | 2011-100341 A | 5/2011 |
| KR | 10-2004-0072286 A | 8/2004 |
| KR | 10-2012-0071465 A | 7/2012 |

OTHER PUBLICATIONS

Killing, J., et al. "A machine vision system for the detection of missing fasteners on steel stampings" Int J Adv Manuf Technol 41:808-819 (2004).
Nguyen V-D., et al. "Exhaustive Detection of Manufacturing Flaws as Abnormalities" IEEE 945-952 (1998).
Notice of Reasons for Refusal issued in Japanese Patent Application No. 2020-005929 dated Sep. 19, 2023, with machine translation.

\* cited by examiner

INSPECTION SUPPORT SYSTEM FOR ERRONEOUS ATTACHMENT USING IMAGE COLOR CONVERSION

CROSS-REFERENCE TO RELATED APPLICATIONS

The present application claims priority from Japanese Patent Application No. 2020-005929 filed on Jan. 17, 2020, the entire contents of which are hereby incorporated by reference.

BACKGROUND

The technology relates to an inspection support system for erroneous attachment. For instance, the technology relates to an inspection support system for erroneous attachment, which detects the erroneous attachment of a component upon, for example, assembly of an aircraft.

An inspection of erroneous attachment, intended to detect the presence of the erroneous attachment of a component upon assembly of an aircraft, has been performed visually at present.

For example, to perform the inspection of the erroneous attachment, an operator or an examiner visually determines whether multiple components are each a correct component. The operator or the examiner also visually determines whether a certain component is attached to another component in a correct manner, such as whether a position, an orientation, an angle, etc. of a certain component attached to another component is correct.

SUMMARY

An aspect of the technology provides an inspection support system for erroneous attachment. The inspection support system includes an imaging device and an erroneous attachment detector. The imaging device is configured to capture an image that represents a state in which multiple components are attached to each other. The erroneous attachment detector is configured to convert a color space of the image captured by the imaging device into an HSV color space, create a comparative image on the basis of hue and saturation in the HSV color space, determine whether the multiple components are each a correct component and whether the multiple components are attached to each other in a correct manner by comparing the comparative image with a correct image, in which the correct image is based on the hue and the saturation and represents a state in which the multiple components are attached to each other correctly, and detect the erroneous attachment of at least one of the multiple components, in a case where the erroneous attachment detector determines that the at least one of the multiple components is not the correct component and/or that the at least one of the multiple components is not attached in the correct manner.

An aspect of the technology provides an inspection support system for erroneous attachment. The inspection support system includes an imaging device and circuitry. The imaging device is configured to capture an image that represents a state in which multiple components are attached to each other. The circuitry is configured to convert a color space of the image captured by the imaging device into an HSV color space, create a comparative image on the basis of hue and saturation in the HSV color space, determine whether the multiple components are each a correct component and whether the multiple components are attached to each other in a correct manner by comparing the comparative image with a correct image, in which the correct image is based on the hue and the saturation and represents a state in which the multiple components are attached to each other correctly, and detect the erroneous attachment of at least one of the multiple components, in a case where the at least one of the multiple components is determined as not being the correct component and/or the at least one of the multiple components is determined as not being attached in the correct manner.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
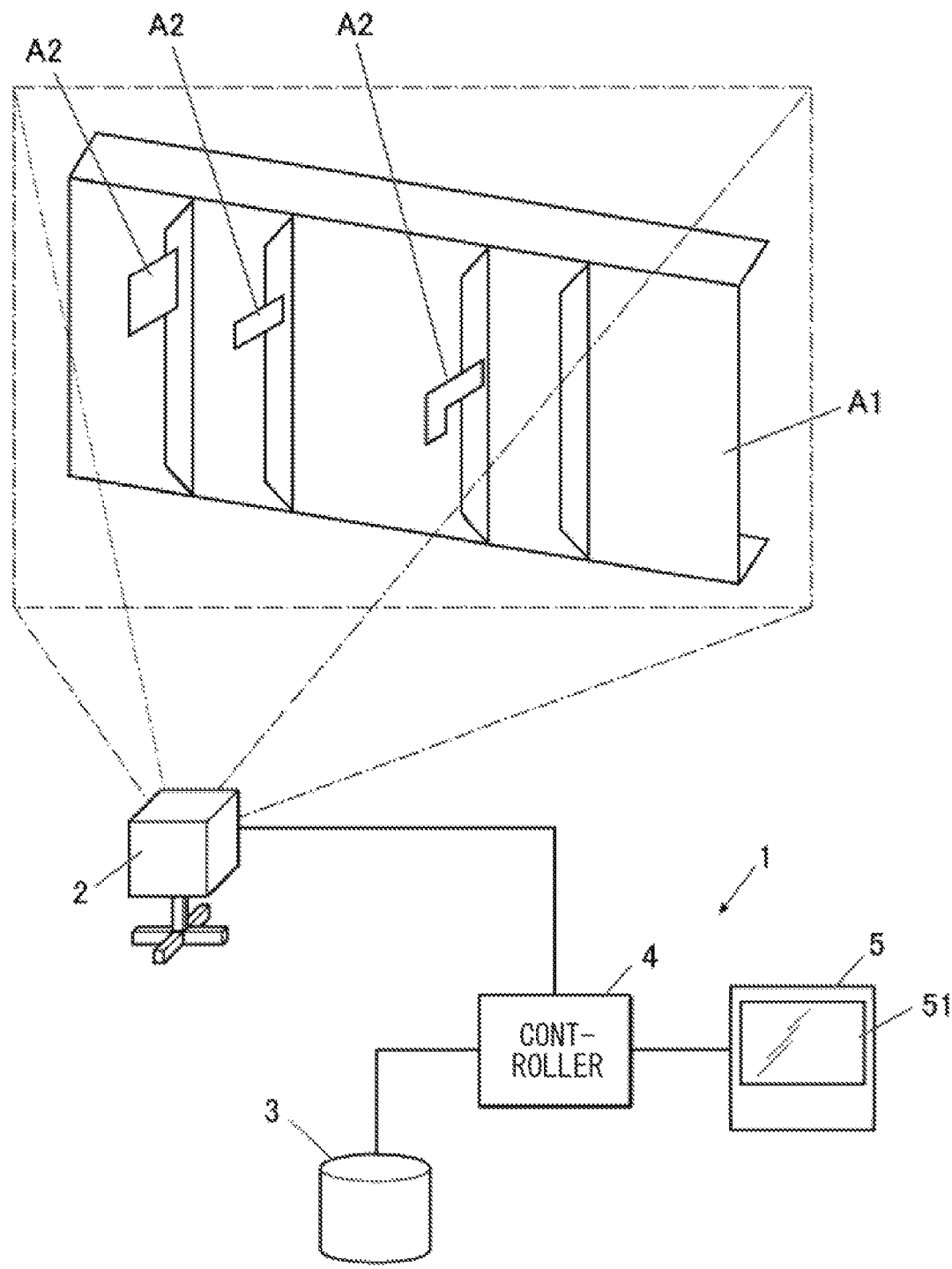
FIG. 1 is a diagram illustrating an example of a configuration of an inspection support system for erroneous attachment according to one example embodiment of the technology.

Many components exist for the components of an aircraft, which are extremely similar to each other in shape, etc. Accordingly, for example, performing an inspection of erroneous attachment visually can cause oversight of attachment, to a certain component, of another component that is similar to a component supposed to be attached to the certain component. The visual inspection can also cause oversight of attachment where mixing up of two components that are similar to each other has occurred, for example.

To address such issues, a development of a technique has been in progress that captures, with a camera, an image representing a state in which multiple components are attached, and that performs the inspection of the erroneous attachment of the components by means of image processing.

However, capturing the image of the multiple components that are attached to each other while irradiating the multiple components with light causes a shadow of one component on a surface of another component. A shape of the shadow of the component changes depending on a direction of irradiation of light. Accordingly, an influence of the shadow can result in a failure in proper recognition of a shape of the component itself in the image, which in turn can sometimes lead to a failure in a proper inspection of erroneous attachment.

For example, Japanese Unexamined Patent Application Publication (JP-A) No. 2011-100341 discloses a method of determining an edge of a component without involving an influence of a shadow. The method so disposes a plurality of light sources as to surround the component in a semicircular formation and captures, with a camera, images of the component while lighting the plurality of light sources one by one in order. The method performs processing including a gradation process on all the images to thereby detect the edge of the component.

The method, however, requires extensive capturing of the images point by point, in order to determine whether a second component is attached correctly to a first component. Hence, the method necessitates an extensive inspection work and can be troublesome for a user.

It is desirable to provide an inspection support system for erroneous attachment, which makes it possible to support an inspection of the erroneous attachment of a component on the basis of an image captured under a situation in which a shadow of another component appears upon attachment of the other component to a certain component, without involving an influence of the shadow.

In the following, an inspection support system for erroneous attachment according to some embodiments of the technology are described in detail with reference to the accompanying drawings. Note that sizes, materials, specific values, and any other factors illustrated in respective embodiments are illustrative for easier understanding of the technology, and are not intended to limit the scope of the technology unless otherwise specifically stated. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. Further, elements that are not directly related to the technology are unillustrated in the drawings.

Note that the following example embodiment is directed to an inspection of whether a component of an aircraft is attached correctly to another component. The inspection support system for erroneous attachment according to any embodiment of the technology, however, is not limited thereto. In some embodiments, the inspection support system for erroneous attachment may be applied to an inspection of the erroneous attachment of a component of any mobile body, such as a vehicle or a vessel, to another component.

FIG. 1 illustrates an example of a configuration of an inspection support system for erroneous attachment 1 according to an example embodiment of the technology.

The inspection support system for erroneous attachment 1 according to an example embodiment includes an imaging device 2 and a controller 4. The inspection support system for erroneous attachment 1 may also include a database 3 and a display 5.

The inspection support system for erroneous attachment 1 may also include a lighting device 6. The lighting device 6 is unillustrated in FIG. 1 and is described in greater detail later. It is to be also noted that, for easier understanding of the description, an example embodiment is described below in which a second component A2 having a relatively small size is attached to a first component A1 having a relatively large size. The inspection support system for erroneous attachment 1, however, is also applicable to a case where components having their respective sizes equal to or equivalent to each other are attached mutually.

The imaging device 2 is configured to capture an image that represents a state in which the multiple components A1 and A2, e.g., the first component A1 and the second component A2, are attached to each other. In an example embodiment, the imaging device 2 may capture a static color image I represented in RGB color space. The imaging device 2 may transmit, to the controller 4, the captured image I in which the first component A1 and the second component A2 are attached to each other.

In an example embodiment, an image of a member such as the first component A1 may be captured with the member being fixed by an unillustrated jig, allowing a positional relationship between the imaging device 2 and the member such as the first component A1 to be the same as that of a case where a later-described correct image I0 is captured.

The database 3 may be a storage provided in the controller 4. The database 3 does not necessarily have to be coupled directly to the controller 4 and/or any other device. In some embodiments, the database 3 may be coupled to the controller 4 and/or any other device via a communication network, or may be a cloud-based network.

The database 3 may contain in advance the correct image I0 obtained by the capturing. The correct image I0 represents a state in which the first component A1 and the second component A2 are attached to each other correctly.

A description is given now of the correct image I0.

For example, to assemble an aircraft, whether components are correctly attached to each other, etc. are closely inspected, as FAI (First Article Inspection), for each location at which components are attached, upon assembling the first aircraft. Upon the FAI, an image representing a state in which the components (e.g., the first component A1 and the second component A2) are attached correctly is captured. In an example embodiment, the image captured upon the FAI may be stored in the database 3 as the correct image I0, which is obtained by the capturing and represents the state in which the first component A1 and the second component A2 are attached correctly.

Note that the correct image I0 is captured upon the FAI, with the member such as the first component A1 being fixed by the unillustrated jig. In addition, when capturing the image I by means of the imaging device 2 of the inspection support system for erroneous attachment 1 according to an example embodiment as described above upon assembling the second aircraft or after, the image I may be captured in a state which is the same as that of a case where the correct image I0 is captured, with the member such as the first component A1 being fixed by the unillustrated jig.

In other words, the imaging device 2 may capture an image on the basis of a distance, a direction, and a magnification which are the same as those at the time of the FAI, with respect to the member such as the first component A1 and the jig. Accordingly, the positional relationship between the imaging device 2 and the member such as the first component A1 upon capturing the image I by means of the imaging device 2 of the inspection support system for erroneous attachment 1 according to an example embodiment may be the same as that of a case where the correct image I0 is captured upon the FAI.

In an example embodiment, the controller 4 may be a computer having devices including CPU (Central Processing Unit), ROM (Read Only Memory), RAM (Random Access Memory), and an input/output interface which are unillustrated. These devices may be coupled to each other via a bus. In some embodiments, the controller 4 may be, for example, a dedicated device.

In the following, a description is given of a configuration of the controller 4. In one embodiment, the controller 4 may serve as an "erroneous attachment detector".

The controller 4 converts the RGB color space of the image I captured by the imaging device 2 as described above into an HSV color space. Further, the controller 4 creates a comparative image I1 on the basis of hue (i.e., an H component) and saturation (i.e., an S component) in the HSV color space. In other words, the comparative image I1 may include no value (i.e., a V component).

The controller 4 may also read, from the database 3, the correct image I0 representing the state in which the first component A1 and the second component A2 are attached correctly. In some embodiments, the controller 4 may perform the image processing as described above to acquire the correct image I0 that is based on the hue and the saturation, in a case where the correct image I0 read from the database 3 is not an image in which the value (i.e., the V component) is removed and is thus not the image based on only the hue (i.e., the H component) and the saturation (i.e., the S component) in the HSV color space as described above.

The controller 4 compares the thus-created comparative image I1 with the correct image I0 that is based on the hue and the saturation, and thereby determines whether the first component A1 and the second component A2 are attached to each other in a correct manner. In an example embodiment, the controller 4 determines: (1) whether the first component A1 and the second component A2 are each a correct component; and (2) whether the first component A1 and the second component A2 are attached to each other in a correct manner.

Figure 7A:
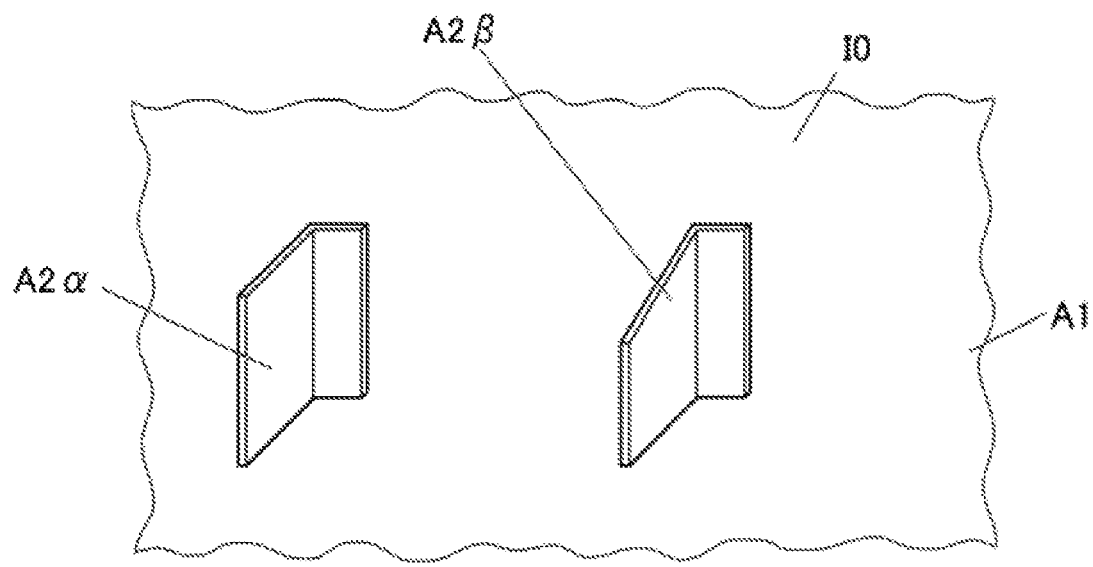
FIG. 7A is a diagram illustrating an example of the correct image.
Figure 7B:
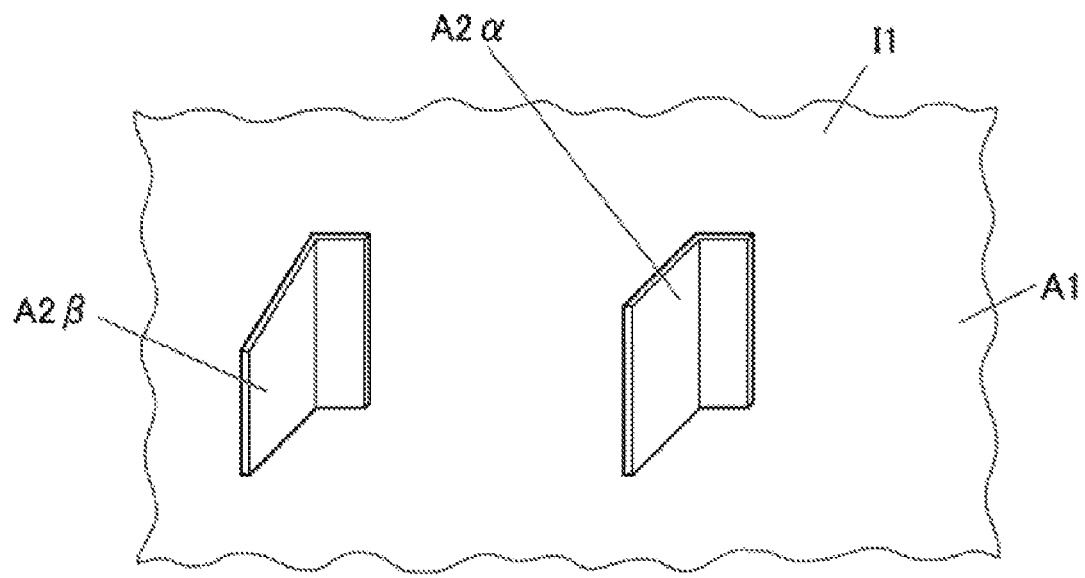
FIG. 7B is a diagram illustrating an example of the comparative image, where mixing up of components has occurred.

Note that the wording "determines whether the first component A1 and the second component A2 are attached to each other in a correct manner" refers not only to the determination as to whether the first component A1 and the second component A2 are attached to each other in a correct manner, but also refers to the determination as to whether the second component A2 is attached to the first component A1 in the first place. Non-limiting examples of the manner may include a position, an orientation, and an angle. In other words, the wording "determines whether the first component A1 and the second component A2 are attached to each other in a correct manner" refers to at least one of: the determination as to whether the first component A1 and the second component A2 are attached to each other at a correct position; the determination as to whether the first component A1 and the second component A2 are attached to each other in a correct orientation; or the determination as to whether the first component A1 and the second component A2 are attached to each other at a correct angle. The determination as to whether the first component A1 and the second component A2 are attached to each other at the correct position includes determining the presence of mistaking one of second components A2α and A2β for another of the second components A2α and A2β subjected to the attachment as illustrated in FIGS. 7A and 7B to be described later, for example.

In an example embodiment, any known method may be used to determine whether there is a difference or a distinction between the comparative image I1 and the correct image I0 by comparing the comparative image I1 with the correct image I0. Accordingly, a description of such a known method will not be provided in detail.

The controller 4 detects the erroneous attachment of the second component A2 in a case where (1) and/or (2) described above is not satisfied as a result of performing the foregoing determination process. In other words, the controller 4 detects the erroneous attachment of the second component A2 in a case where at least one of the conditions: (1) the first component A1 and the second component A2 are each a correct component; or (2) the first component A1 and the second component A2 are attached to each other in a correct manner, is not satisfied.

The display 5 may include a display screen 51. The display screen 51 may be a liquid crystal display, an organic electroluminescence (EL) display, or any other type of display.

The display 5 may notify a user of the erroneous attachment of the first component A1 or the second component A2 detected by the controller 4 (the "erroneous attachment detector" in one embodiment). In one embodiment, the display 5 may serve as a "notifier". A description of the display 5 is given in greater detail later.

A description is given next of an example of an operation of the controller 4 (the "erroneous attachment detector" in one embodiment). In the following description, an example embodiment is described in which the controller 4 detects the erroneous attachment of the second component A2 to the first component A1. In some embodiments, the controller 4 may detect the erroneous attachment of the first component A1. For example, the controller 4 may detect that the first component A1 is not a correct component, or that the first component A1 is attached in an incorrect manner.

Figure 2A:
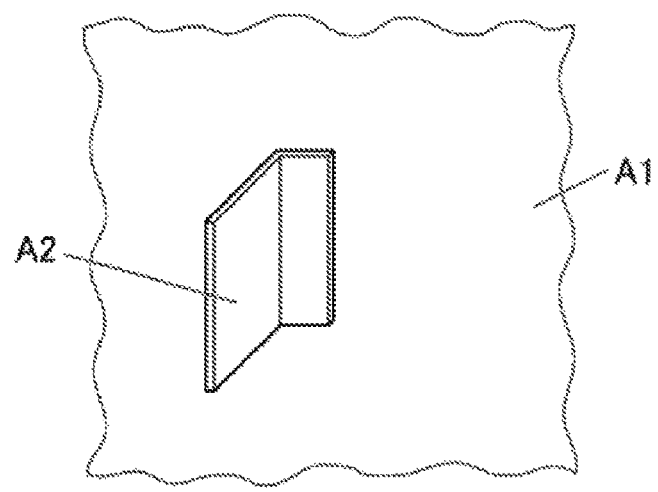
FIG. 2A is a diagram illustrating an example of a state in which a second component is attached to a first component.

FIG. 2A illustrates an example case in which the second component A2 is provided on a front surface of the first component A1. The second component A2 has a rectangular shape that protrudes from the front surface of the first component A1 toward the near side. In this case, a shadow S of the second component A2 is formed above the second component A2 as illustrated by way of example in FIG. 2B when the second component A2 is irradiated with light by the lighting device 6 upwardly from the lower side.

Further, in this case, the shadow S of the second component A2 is formed below the second component A2 as illustrated by way of example in FIG. 2C when the second component A2 in the state illustrated in FIG. 2A is irradiated with light by the lighting device 6 downwardly from the upper side.

Figure 2B:
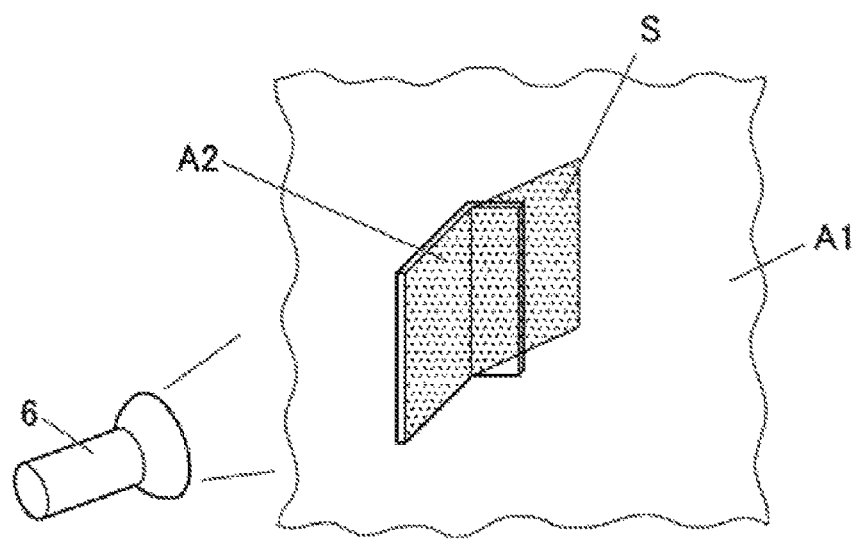
FIG. 2B is a diagram illustrating an example of the state in which the second component is attached to the first component, where the second component is irradiated with light by a lighting device upwardly from the lower side.
Figure 2C:
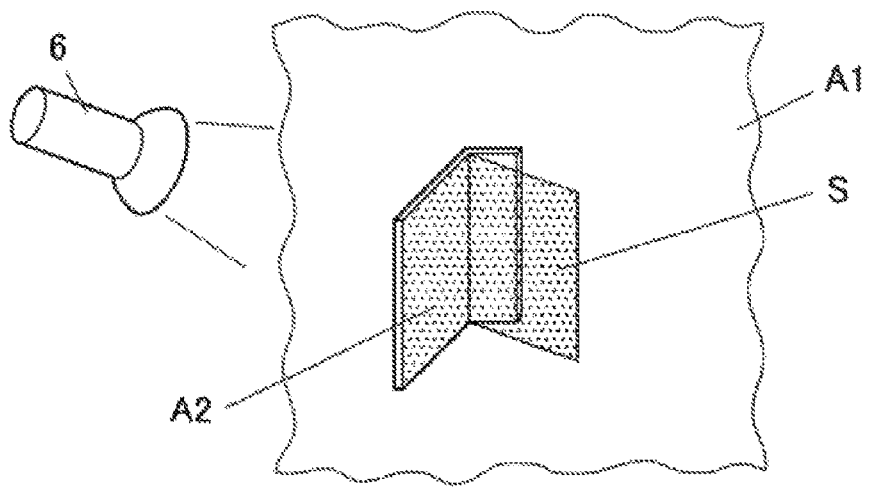
FIG. 2C is a diagram illustrating an example of the state in which the second component is attached to the first component, where the second component is irradiated with light by the lighting device downwardly from the upper side.

Accordingly, if the correct image I0 captured with the second component A2 being irradiated with light in a manner illustrated in FIG. 2B and the image I captured with the second component A2 being irradiated with light in a manner illustrated in FIG. 2C are compared with each other as they are, i.e., if they are compared with the shadow S remaining as it is, shapes of the shadow S in the images differ between the correct image I0 and the currently-acquired image I. Hence, even if the second component A2 is attached correctly to the first component A1 as with the case of the FAI, a possibility arises that the second component A2 is determined as not being attached correctly to the first component A1.

It is also likely that the irradiation of the second component A2 with light by means of the lighting device 6 in the same manner as the FAI is unachievable, even if the second component A2 is irradiated with light by the lighting device 6 with a position, an angle, etc. same as those at the time of the FAI being satisfied.

The inspection support system for erroneous attachment 1 according to an example embodiment takes advantage of the shadow S that appears as a difference in value (i.e., the V component) in a case where the image I is represented in the HSV color space. Hence, the inspection support system for erroneous attachment 1 converts a color space of the image I captured by the imaging device 2, such as the RGB color space, into the HSV color space. Further, the inspection support system for erroneous attachment 1 creates the comparative image I1 only on the basis of the hue (i.e., the H component) and the saturation (i.e., the S component) in the HSV color space to remove the value (i.e., the V component) from the comparative image I1. By removing the value (i.e., the V component) from the comparative image I1, the inspection support system for erroneous attachment 1 may remove the shadow S from the comparative image I1 as a result of eliminating the difference in value (i.e., the V component) from the comparative image I1.

Thus, even if the image I captured by the imaging device 2 contains the shadow S as illustrated in FIGS. 2B and 2C, the comparative image I1 contains less or no shadow S as illustrated in FIG. 2A.

Figure 3A:
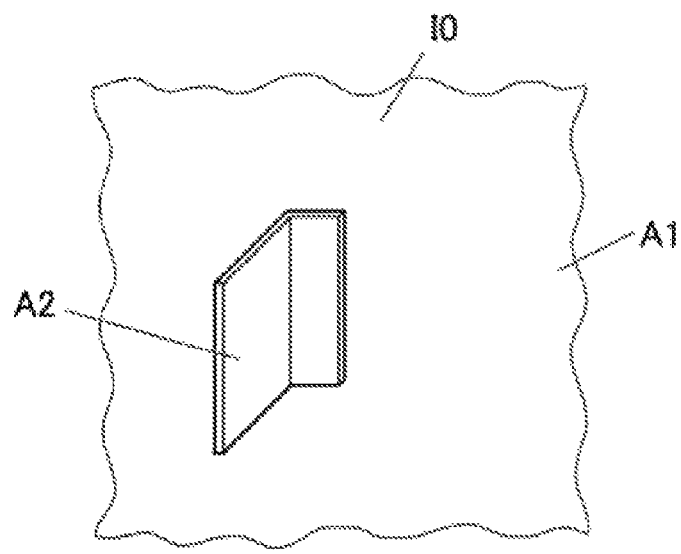
FIG. 3A is a diagram illustrating an example of a correct image.
Figure 3B:
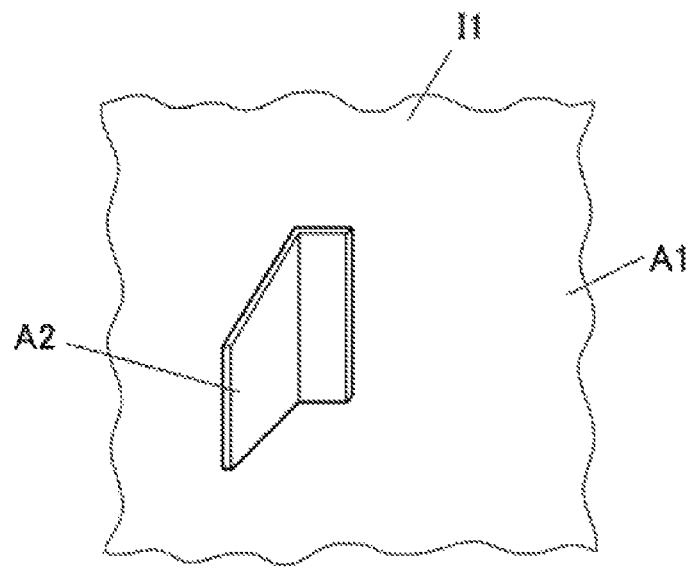
FIG. 3B is a diagram illustrating an example of a comparative image, where an incorrect component is attached.

Hence, for example, in a case where a shape of the second component A2 attached to the first component A1 is different from that of the correct second component A2 as a result of comparing the correct image I0 illustrated in FIG. 3A with the currently-acquired comparative image I1 illustrated in FIG. 3B, it is possible to detect that that the shape of the second component A2 is different from that of the correct second component A2 without involving the influence of the shadow S. Accordingly, it is possible to determine accurately that the correct second component A2 is not attached to the first component A1 in a correct manner.

An example illustrated in FIGS. 3A and 3B corresponds to (1) described above, where the correct second component A2 is not attached to the first component A1, i.e., where the incorrect second component A2 is attached to the first component A1. Note that, although unillustrated, the second component A2 may be determined as being a different component or an incorrect component even when the second component A2 has the same shape as the correct second component A2, if there is any difference between the second component A2 and the correct second component A2. For example, the second component A2 may be determined as being a different component or an incorrect component even when the second component A2 has the same shape as the correct second component A2 in a case where the second component A2 has a hole that is provided at a location different from that of the correct second component A2, or has a hole having a size different from that of the correct second component A2.

Figure 4A:
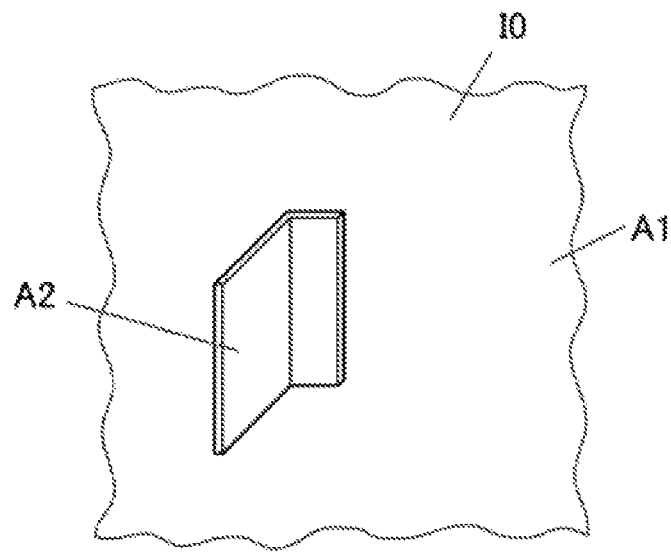
FIG. 4A is a diagram illustrating an example of the correct image.
Figure 4B:
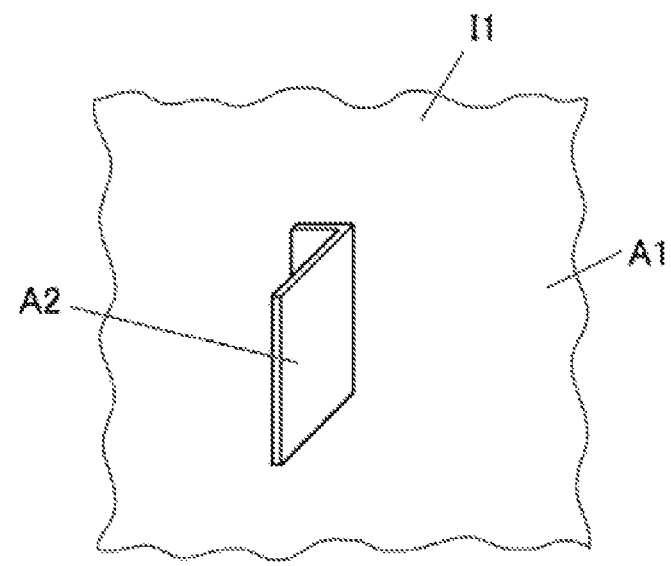
FIG. 4B is a diagram illustrating an example of the comparative image, where a component is attached in an incorrect orientation.

As a result of comparing the correct image I0 illustrated in FIG. 4A with the currently-acquired image I1 illustrated in FIG. 4B, for example, it is possible to determine accurately in this case that the second component A2 is a correct component but (2) described above is not satisfied, i.e., the second component A2 is not attached to the first component A1 in a correct manner.

In other words, an example illustrated in FIGS. 4A and 4B corresponds to a case where the second component A2 is a correct component but is not attached to the first component A1 in a correct orientation, i.e., is attached to the first component A1 in an incorrect orientation.

Figure 5A:
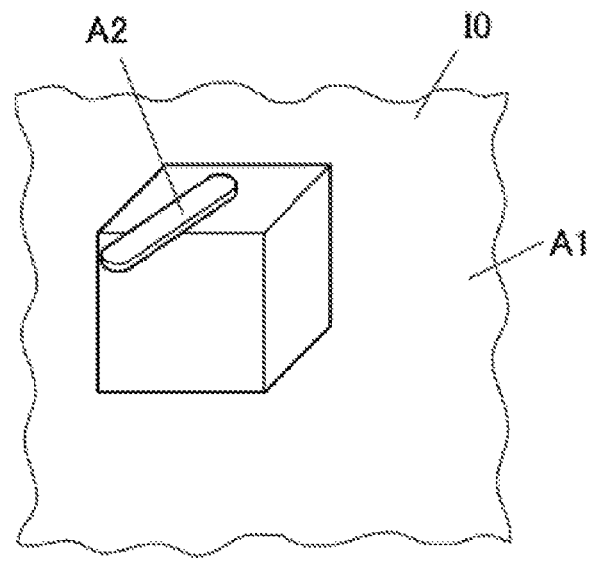
FIG. 5A is a diagram illustrating an example of the correct image.
Figure 5B:
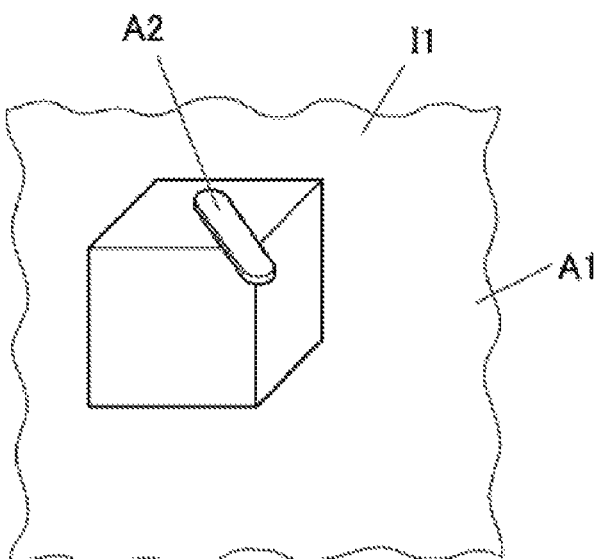
FIG. 5B is a diagram illustrating an example of the comparative image, where a component is attached at an incorrect angle.

As a result of comparing the correct image I0 illustrated in FIG. 5A with the currently-acquired image I1 illustrated in FIG. 5B, for example, it is possible to determine accurately in this case as well that the second component A2 is a correct component but (2) described above is not satisfied, i.e., the second component A2 is not attached to the first component A1 in a correct manner.

In other words, an example illustrated in FIGS. 5A and 5B corresponds to a case where the second component A2 is a correct component but is not attached to the first component A1 at a correct angle, i.e., is attached to the first component A1 at an incorrect angle.

Figure 6A:
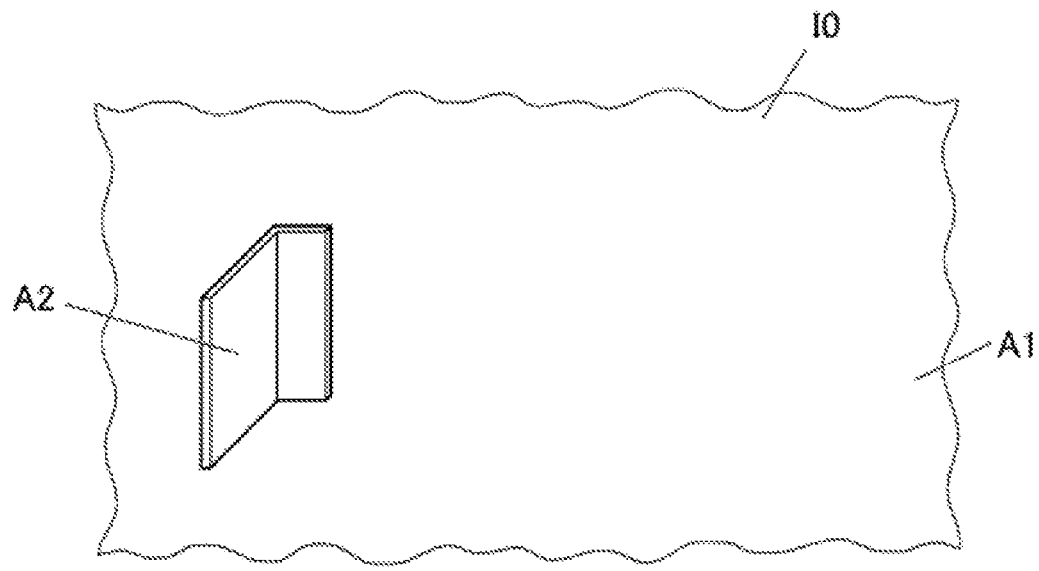
FIG. 6A is a diagram illustrating an example of the correct image.
Figure 6B:
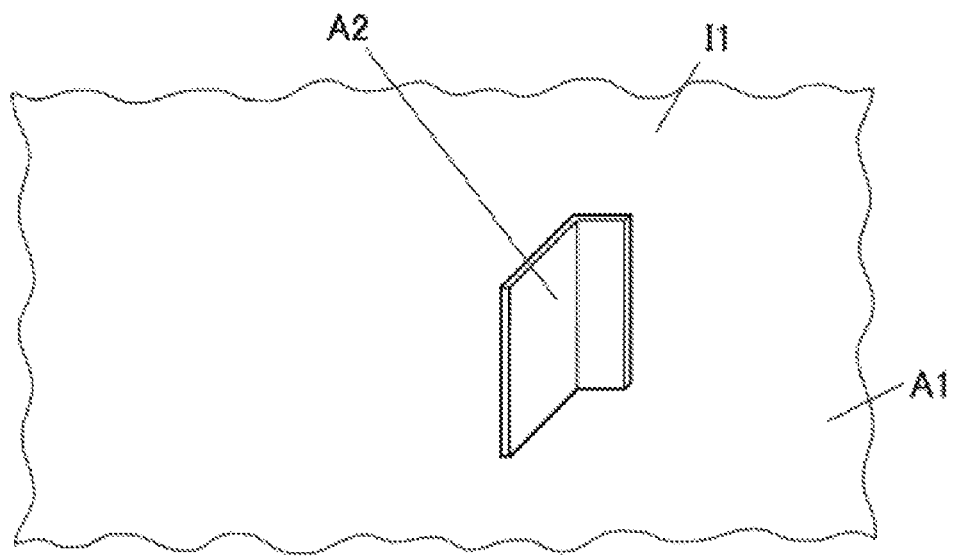
FIG. 6B is a diagram illustrating an example of the comparative image, where a component is attached at an incorrect position.

As a result of comparing the correct image I0 illustrated in FIG. 6A with the currently-acquired image I1 illustrated in FIG. 6B, for example, it is possible to determine accurately in this case as well that the second component A2 is a correct component and that the second component A2 is attached to the first component A1 in the correct orientation and at the correct angle, but (2) described above is not satisfied, i.e., the second component A2 is not attached to the first component A1 in a correct manner.

In other words, an example illustrated in FIGS. 6A and 6B corresponds to a case where the second component A2 is a correct component but is not attached to the first component A1 at a correct position, i.e., is attached to the first component A1 at an incorrect position. Note that the attachment of the second component A2 to the first component A1 at an incorrect position encompasses mixing up the second components A2a and A243 or mistaking one of the second components A2a and A243 for another of the second components A2a and A243 subjected to the attachment as illustrated in FIGS. 7A and 7B, for example.

Figure 8A:
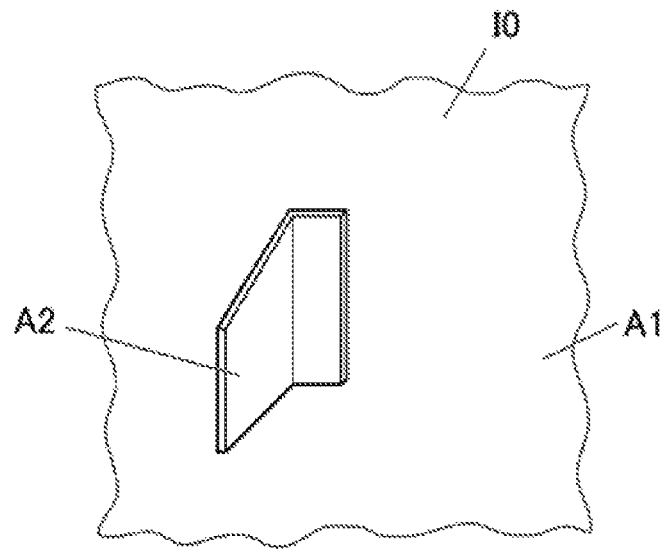
FIG. 8A is a diagram illustrating an example of the correct image.
Figure 8B:
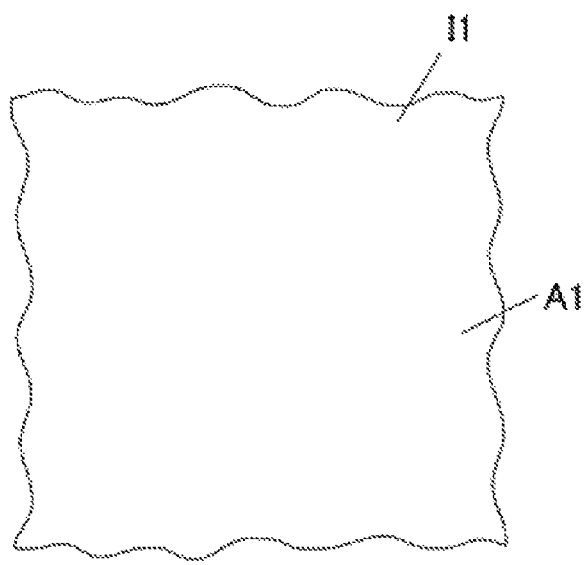
FIG. 8B is a diagram illustrating an example of the comparative image, where no component is attached.

As a result of comparing the correct image I0 illustrated in FIG. 8A with the currently-acquired image I1 illustrated in FIG. 8B, for example, it is possible to determine accurately that the second component A2 is not attached to the first component A1, i.e., (2) described above is not satisfied.

In other words, the attachment of the correct second component A2 to the first component A1 in an incorrect manner encompasses absence of the attachment of the second component A2 to the first component A1 in the first place.

The foregoing description refers to the examples where the erroneous attachment occurs for the second component A2. Note, however, that the erroneous attachment can also occur for the first component A1 as described above. For example, there can be a case where the first component A1 is not a correct component, or where the first component A1 is attached in an incorrect manner.

Even such a case, the inspection support system for erroneous attachment 1 according to an example embodiment makes it possible to detect the erroneous attachment of the first component A1 in a manner similar to that described above.

The inspection support system for erroneous attachment 1 according to at least one embodiment of the technology therefore includes the erroneous attachment detector 4. The erroneous attachment detector 4 is configured to convert a color space of the image I captured by the imaging device 2 into the HSV color space, and create the comparative image I1 only on the basis of the hue (i.e., the H component) and the saturation (i.e., the S component) in the HSV color space. In other words, the erroneous attachment detector 4 is configured to create the comparative image I1 in which the value (i.e., the V component) is removed. Further, the erroneous attachment detector 4 is configured to determine whether the multiple components (e.g., the first component A1 and the second component A2) are each a correct component and whether the multiple components (e.g., the first component A1 and the second component A2) are attached to each other in a correct manner by comparing the created comparative image I1 with the captured correct image I0. The correct image I0 is based on the hue and the saturation and represents a state in which the multiple components (e.g., the first component A1 and the second component A2) are attached to each other correctly. The erroneous attachment detector 4 is configured to detect the erroneous attachment of at least one of the multiple components (e.g., the first component A1 and the second component A2), in a case where the erroneous attachment detector 4 determines that the at least one of the multiple components is not the correct component and/or that the at least one of the multiple components is not attached in the correct manner.

With this configuration, for example, it is possible to support an inspection of the erroneous attachment of a component, on the basis of the image I that is captured under a situation in which a shadow of another component, attached to a certain component, appears upon irradiation of the other component with light (i.e., on the basis of the comparative image I1 created on the basis of the image I), without involving an influence of the shadow.

Accordingly, it is possible to determine the erroneous attachment of the component with the shadow S represented in the value (i.e., the V component) being removed from the comparative image I1, without the necessity of performing the extensive imaging disclosed in JP-A No. 2011-100341, for example. Thus, it is possible to accurately detect the erroneous attachment upon the presence of the erroneous attachment, and thereby to support the inspection of the erroneous attachment appropriately.

Described now specifically is an operation of the display 5 (the "notifier" in one embodiment).

In some embodiments, as described previously, the display 5 may notify the user of the erroneous attachment of the second component A2 in a case where the controller 4 (the "erroneous attachment detector" in one embodiment) has detected the erroneous attachment of the second component A2.

In the following description, an example embodiment is described in which the second component A2 is erroneously attached to the first component A1. In some embodiments, the presence of the erroneous attachment of the first component A1 may be displayed as with a case of the erroneous attachment of the second component A2, in a case where the first component A1 is erroneously attached.

In addition, an example embodiment is described in the following in which the comparative image I1 is displayed on the display screen 51 of the display 5 (the "notifier" in one embodiment) and the erroneous attachment of the second component A2 is notified by means of displaying. In some embodiments, the erroneous attachment of the first component A1, the second component A2, or both may be notified by sound and/or voice, instead of or in addition to the notification by means of displaying.

In an example embodiment, the display 5 (the "notifier" in one embodiment) may at least display the comparative image I1 on the display screen 51. In a case where the controller 4 (the "erroneous attachment detector" in one embodiment) detects the erroneous attachment of any component as described above, such as the second component A2 in an example embodiment, the display 5 may highlight a region, of the comparative image I1, that contains the second component A2 in which the erroneous attachment is detected, or may highlight a region, of the comparative image I1, that contains a part in which the second component A2 supposed to be attached is not attached.

In the following, a description is given in detail with reference to examples of displaying performed on the display screen 51.

Figure 9:
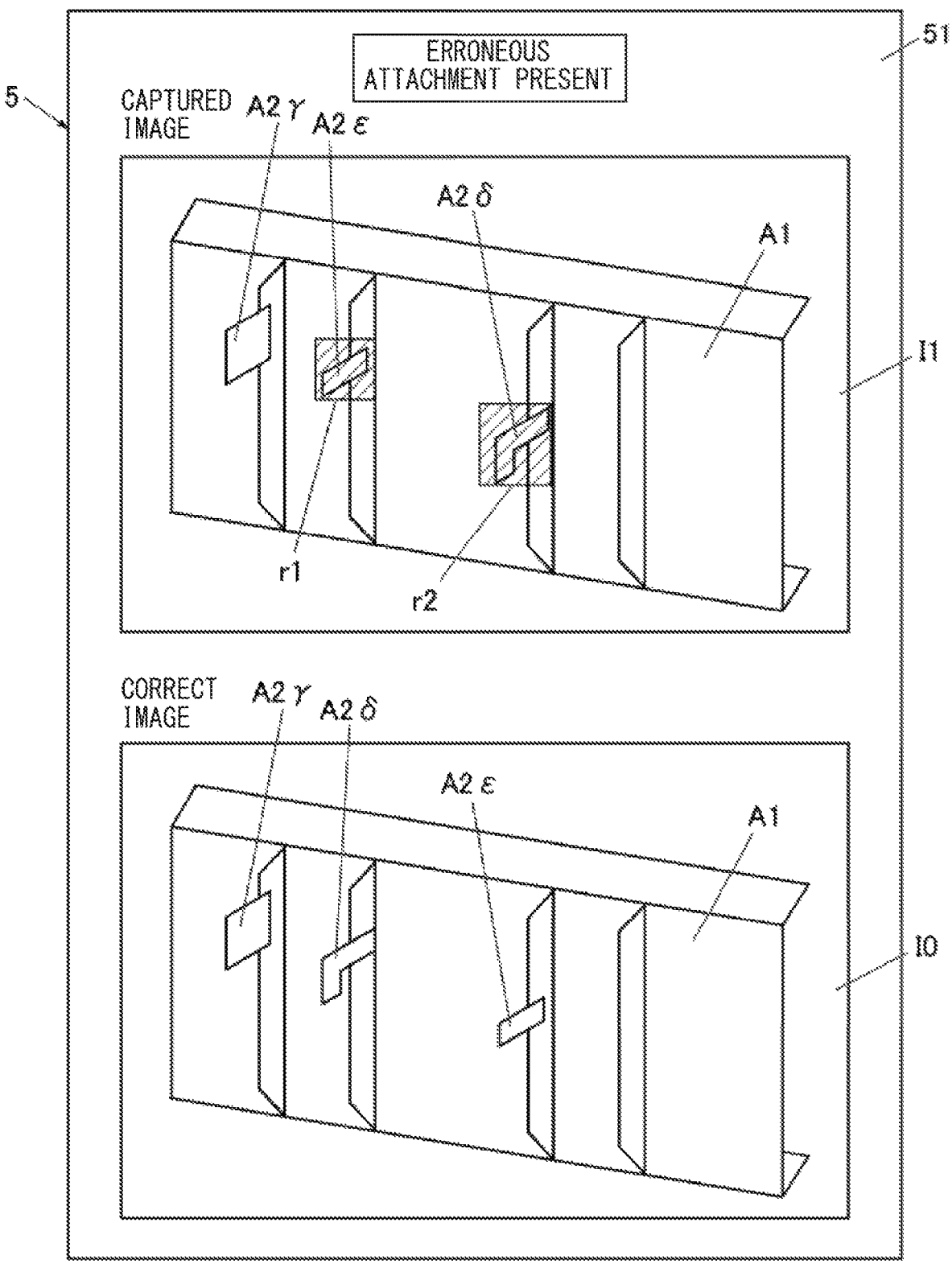
FIG. 9 is a diagram illustrating an example of displaying performed on a display screen, where image regions in each of which erroneous attachment of a component is detected are each highlighted.

For example, displaying illustrated by way of example in FIG. 9 may be performed on the display screen 51 of the display 5.

FIG. 9 illustrates an example in which the comparative image I1 created on the basis of the currently-captured image I is displayed as a "CAPTURED IMAGE" on an upper part of the display screen 51, and the correct image I0 corresponding to the created comparative image I1 is displayed as a "CORRECT IMAGE" on a lower part of the display screen 51.

As can be appreciated from an example illustrated in FIG. 9 by comparing the correct image I0 and the comparative image I1 with each other, mixing up of second components A2δ and A2ε has occurred among three second components A2γ to A2ε that are attached to the first component A1. In such a case, an example embodiment may notify the user of the erroneous attachment by displaying "ERRONEOUS ATTACHMENT PRESENT" on an uppermost part of the display screen 51 to explicitly indicate, to the user, the presence of the erroneous attachment.

In addition thereto, regions r1 and r2 of the comparative image I1 respectively containing the second component A2δ and the second component A2ε, in each of which the erroneous attachment is detected, may be displayed in a different manner from any other region of the comparative image I1 to highlight the regions r1 and r2. For example, the regions r1 and r2 may be displayed in a conspicuous color or displayed in a blinking fashion.

Figure 10:
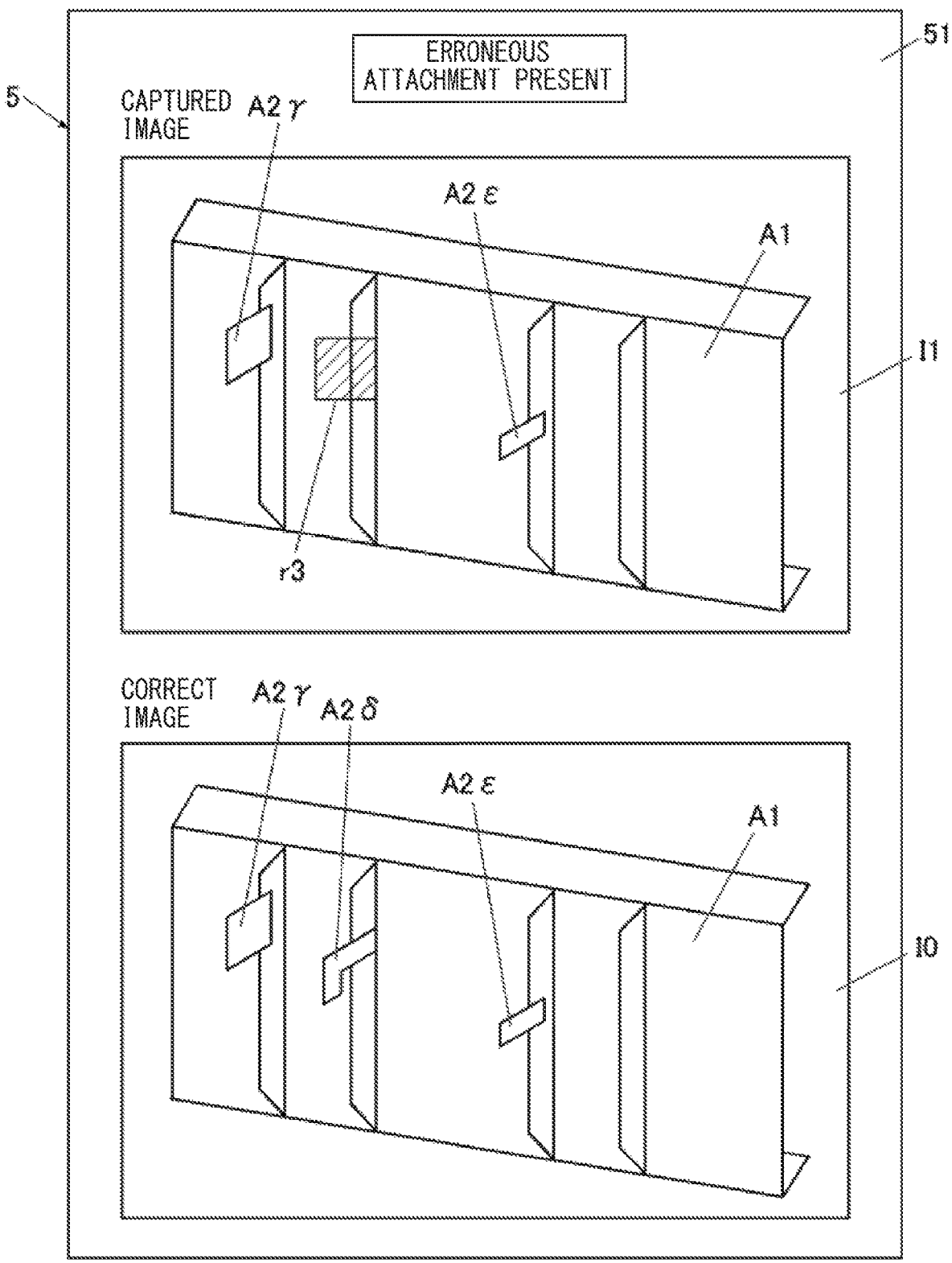
FIG. 10 is a diagram illustrating another example of displaying performed on the display screen, where an image region in which erroneous attachment of a component is detected is highlighted.

FIG. 10 illustrates an example in which the user has forgotten to attach the second component A2δ to the first component A1. In such a case, an example embodiment may notify the user of the erroneous attachment by displaying "ERRONEOUS ATTACHMENT PRESENT" on the uppermost part of the display screen 51 to explicitly indicate, to the user, the presence of the erroneous attachment. In addition thereto, a region r3, of the comparative image I1, that contains a part in which the second component A26, supposed to be attached, is not attached may be highlighted.

An example embodiment described above may highlight, for example, the regions r1 and r2 (FIG. 9), of the comparative image I1 displayed on the display screen 51, that respectively contain the second components A2δ and A2δ in each of which the erroneous attachment is detected, upon notifying, with the display 5 (the "notifier" in one embodiment), the user of the erroneous attachment of the second component A2 detected by the controller 4 (the "erroneous attachment detector" in one embodiment). Upon notifying, with the display 5, the user of the erroneous attachment of the second component A2 detected by the controller 4, an example embodiment described above may highlight, for example, the region r3 (FIG. 10), of the comparative image I1 displayed on the display screen 51, that contains a part in which the second component A2δ supposed to be attached is not attached. Thus, it is possible to inform or notify the user, such as an operator or an examiner, of the erroneous attachment of the second component A2 (including forgetting to attach the second component A2; the same holds true hereinafter) in a case where the erroneous attachment is present. Hence, it is possible to allow the user to take an appropriate action, such as reattaching the second component A2.

Accordingly, it is possible to prevent man-hours, such as man-hours required for the reattachment, from increasing in a postprocess appropriately. It is also possible to reduce the occurrence of troubles.

Figure 11:
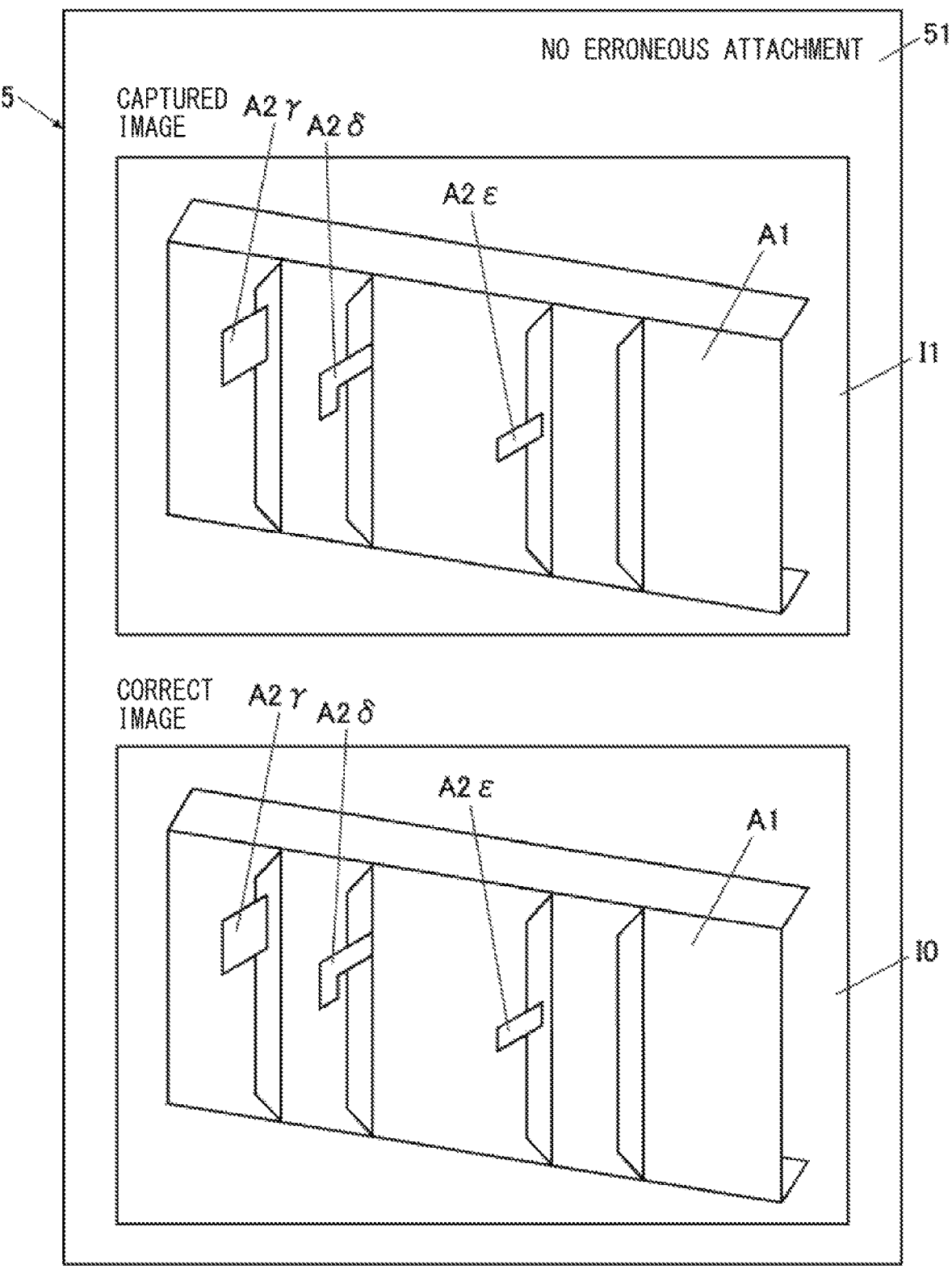
FIG. 11 is a diagram illustrating an example of displaying performed on the display screen, where no erroneous attachment is detected.

In a case where the controller 4 (the "erroneous attachment detector" in one embodiment) has not detected the erroneous attachment, an example embodiment may not perform, on the display screen 51 of the display 5, the highlight displaying in the comparative image I1 that indicates the erroneous attachment, as illustrated by way of example in FIG. 11. In such a case, for example, displaying such as "NO ERRONEOUS ATTACHMENT" may be performed on the display screen 51 to inform or notify the user of no detection of the erroneous attachment.

The comparative image I1 on which no highlight displaying or the like is performed can be an evidence proving that the erroneous attachment is not detected by the controller 4 (the "erroneous attachment detector" in one embodiment).

Accordingly, in some embodiments, the controller 4 (the "erroneous attachment detector" in one embodiment) may store, as a history, the comparative image I1 in which no erroneous attachment is detected in a storage, such as the database 3. In one embodiment, the database 3 may serve as a "storage".

Such a configuration, for example, makes it possible to prove that, in a case where a trouble has occurred, no erroneous attachment is occurred at least at the time of the attachment of the second component A2 to the first component A1 on the grounds of the history, by confirming the history of any part having the trouble.

Note that the inspection support system for erroneous attachment 1 according to an example embodiment does not allow for understanding of, for example, whether a strength of the attachment of the second component A2 to the first component A1 is sufficient even on the basis of the comparative image I1. Accordingly, an inspection on the strength of the attachment of the second component A2 to the first component A1 may be performed separately.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The controller 4 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 4. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 4 illustrated in FIG. 1.

The invention claimed is:

1. An inspection support system for erroneous attachment, the inspection support system comprising:
a controller including a processor and a memory communicably connected with the processor; and
an imaging device communicably connected with the controller and configured to capture an image that represents a state in which multiple components are attached to each other, wherein
the controller is configured to
convert a color space of the image captured by the imaging device into an HSV color space,
create a comparative image on a basis of hue and saturation in the HSV color space,
determine whether the multiple components are each a correct component and whether the multiple components are attached to each other in a correct manner by comparing the comparative image with a correct image, the correct image being based on the hue and the saturation and representing a state in which the multiple components are attached to each other correctly, and
detect the erroneous attachment of at least one of the multiple components, in a case where the erroneous attachment detector determines that the at least one of the multiple components is not the correct component and/or that the at least one of the multiple components is not attached in the correct manner, and
wherein the comparative image is constituted by only hue (H) and saturation (S) in the HSV color space of the image and omits value (V) in the HSV color space of the image.

2. The inspection support system for the erroneous attachment according to claim 1, wherein the determining whether the multiple components are attached to each other in the correct manner comprises at least one of: determining whether the multiple components are attached to each other at a correct position; determining whether the multiple components are attached to each other in a correct orientation; or determining whether the multiple components are attached to each other at a correct angle.

3. The inspection support system for the erroneous attachment according to claim 2, wherein the determining whether the multiple components are attached to each other at the correct position comprises determining presence of mistaking one of the multiple components for another of the multiple components subjected to attachment.

4. The inspection support system for the erroneous attachment according to claim 1, wherein the erroneous attachment of the at least one of the multiple components comprises absence of attachment of one of the multiple components to another of the multiple components.

5. The inspection support system for the erroneous attachment according to claim 2, wherein the erroneous attachment of the at least one of the multiple components comprises absence of attachment of one of the multiple components to another of the multiple components.

6. The inspection support system for the erroneous attachment according to claim 3, wherein the erroneous attachment of the at least one of the multiple components comprises absence of attachment of one of the multiple components to another of the multiple components.

7. The inspection support system for the erroneous attachment according to claim 1, further comprising a notifier comprising a display screen and configured to notify a user of the erroneous attachment of the at least one of the multiple components detected by the erroneous attachment detector.

8. The inspection support system for the erroneous attachment according to claim 2, further comprising a notifier comprising a display screen and configured to notify a user of the erroneous attachment of the at least one of the multiple components detected by the erroneous attachment detector.

9. The inspection support system for the erroneous attachment according to claim 3, further comprising a notifier comprising a display screen and configured to notify a user of the erroneous attachment of the at least one of the multiple components detected by the erroneous attachment detector.

10. The inspection support system for the erroneous attachment according to claim 7, wherein
the display screen is configured to display the comparative image, and the notifier is configured to
highlight, on the display screen, a region, of the comparative image, that contains any of the multiple components in which the erroneous attachment is detected by the erroneous attachment detector, or
highlight, on the display screen, a region, of the comparative image, that contains a part in which any of the multiple components, supposed to be attached, is determined by the erroneous attachment detector as not being attached.

11. The inspection support system for the erroneous attachment according to claim 8, wherein
the display screen is configured to display the comparative image, and the notifier is configured to
highlight, on the display screen, a region, of the comparative image, that contains any of the multiple components in which the erroneous attachment is detected by the erroneous attachment detector, or
highlight, on the display screen, a region, of the comparative image, that contains a part in which any of the multiple components, supposed to be attached, is determined by the erroneous attachment detector as not being attached.

12. The inspection support system for the erroneous attachment according to claim 9, wherein
the display screen is configured to display the comparative image, and the notifier is configured to
highlight, on the display screen, a region, of the comparative image, that contains any of the multiple components in which the erroneous attachment is detected by the erroneous attachment detector, or
highlight, on the display screen, a region, of the comparative image, that contains a part in which any of the multiple components, supposed to be attached, is determined by the erroneous attachment detector as not being attached.

13. The inspection support system for the erroneous attachment according to claim 1, further comprising a storage communicably connected with the controller and configured to store, as a history, the comparative image in which the erroneous attachment is not detected by the erroneous attachment detector.

14. The inspection support system for the erroneous attachment according to claim 2, further comprising a storage communicably connected with the controller and configured to store, as a history, the comparative image in which the erroneous attachment is not detected by the erroneous attachment detector.

15. The inspection support system for the erroneous attachment according to claim 3, further comprising a storage communicably connected with the controller and configured to store, as a history, the comparative image in which the erroneous attachment is not detected by the erroneous attachment detector.

16. The inspection support system for the erroneous attachment according to claim 1, wherein the controller is configured to store the correct image in a database.

17. The inspection support system for the erroneous attachment according to claim 2, wherein the controller is further configured to store the correct image in a database.

18. The inspection support system for the erroneous attachment according to claim 3, wherein the controller is configured to store the correct image in a database.

19. An inspection support system for erroneous attachment, the inspection support system comprising:
an imaging device communicably connected with circuitry and configured to capture an image that represents a state in which multiple components are attached to each other; and
the circuitry configured to
convert a color space of the image captured by the imaging device into an HSV color space,
create a comparative image on a basis of hue and saturation in the HSV color space,
determine whether the multiple components are each a correct component and whether the multiple components are attached to each other in a correct manner by comparing the comparative image with a correct image, the correct image being based on the hue and the saturation and representing a state in which the multiple components are attached to each other correctly, and
detect the erroneous attachment of at least one of the multiple components, in a case where the at least one of the multiple components is determined as not being the correct component and/or the at least one of the multiple components is determined as not being attached in the correct manner,
wherein the comparative image is constituted by only hue (H) and saturation (S) in the HSV color space of the image and omits value (V) in the HSV color space of the image.

* * * * *